Patented Feb. 3, 1942

2,271,906

UNITED STATES PATENT OFFICE 2,271,906

CARVING MATERIAL

Esther Bly Williams, West Linn, Oreg.

No Drawing. Application December 8, 1939,
Serial No. 308,195

7 Claims. (Cl. 106—206)

This invention relates to an artificial marble for carving practice, principally for use in art schools and for similar purposes and has for its object the provision of an inexpensive material of superior qualities for the purpose stated.

The objectives to be reached are as follows:

To be easily moulded into blocks or other shapes suitable in size for the art object the student will attempt to produce, being ready for use in a comparatively short time.

To take a fine sharp stable outline, such as intricate filigree work, a bird's feather representation or slender bill, that when thoroughly dry will have very considerable strength.

Another object is a very fine grained material that will cut slick, like soap, but which unlike soap will not shrink, check, crack, warp, or discolor from atmospheric oxidization.

Another and important object is a material that can be readily softened to easily cuttable condition, from time to time, as for example when a work piece is left uncompleted over a weekend by a student.

A still further object is a material that does not become musty and will take colors well, especially art colors, and by incomplete mixing or kneading two or more batches of different colors together, a fine variegated or marbled appearance will be had.

I accomplish the objects stated and others that will be at once apparent to those familiar with the requirements of such a material by composition of matter, which is the optimum material that I have been able to develop up to the present time, though I do not assert that it cannot be improved upon by varying the proportions somewhat or even varying the materials without departing from the principles herein disclosed.

The basic substance of my material is diatomaceous earth, commonly called diatomite, found in numerous deposits in various places such as at Terre Bonne in the State of Oregon and at near Kittitas in the State of Washington, which when dry is nearly pure white, the white diatomite being prefered to diatomaceous earth containing impurities or native coloring matter; though calcium sulphate sometimes found in it decreases the amount of hardening material required.

The following proportions of ingredients as named make the best blocks that I am able to make at present.

Diatomite, five pounds.
Art color, two ounces.
Animal fat, three ounces.
Lye crystals, one ounce.
Dextrin, two ounces, a water absorbent binder.
Oil of cloves, one quarter ounce, an aromatic preservative.
Water, clear, three pounds.

I mix the dry ingredients together very thoroughly to get a uniform mixture as nearly as possible; dissolve the lye in part of the water; melt the fat and stir into the lye water; dissolve the dextrin in some of the remaining water and add the oil of cloves which prevents mustiness of the material. Then I mix all together into a plastic mass, adding the color just before or during the mixing process.

When thoroughly mixed I mould the plastic mass into containers that will produce a block of the size and character required, which will set, ready for use in from twelve hours upward.

In two or three days the material becomes quite hard, in fact too hard for fine work; but it may be very readily softened by submerging for a few seconds in a luke warm water bath or, as to surface, by holding it under a warm water faucet say five seconds, which will soften the surface at any point. The stream of water should not issue with violence.

By making up two or more batches, differently colored, and folding or partially kneading the sheets of the materials together, an almost infinite variety of color effects may be produced.

This material has the further advantage that new material can be added to old by softening the juncture and firmly pressing the parts together, being careful to exclude air pockets, by which means a part of the work accidentally spoiled or which is below the standard of the rest of the work can readily be done over again in new material.

For the preservative, I regard oil of cloves as the best, though oil of wintergreen, formaldehyde or carbolic acid may be substituted, the latter two not having the pleasant odor of the cloves or wintergreen.

The saponaceous fat and lye ingredient makes for smooth glossy surface texture and may be varied within limits.

One of the important ingredients is the dextrin which I believe to be the best as well as the least expensive, though a mixture of glue and glycerine will substitute more or less effectively as will corn syrup, which is a dextrose material. Glucose can be used as can many other dextrorotary substances. Gum arabic can be used but it is not as good and costs much more.

The exceedingly fine, yet uniform granular nature of the diatomite particles renders the substance very suitable for the base material, which takes color well.

The substance may be colored with wax crayons instead of mixing the color with the material, and when wax crayons are applied on the surface the finished article will take a high polish by rubbing.

Having disclosed my new composition and the best way so far developed in which it can be put to beneficial use, what I claim as new and desire to secure by Letters Patent, is:

1. A water softening carving material composed of diatomaceous earth, fat, lye, a water soluble dextrinous binder and a preservative to prevent mustiness, the whole mixed with water until plastic.

2. A carving material composed of substantially five pounds of diatomaceous earth material, art color in the amount required, animal fat three ounces, lye crystals two ounces, dextrin two ounces and about one quarter ounce of aromatic preservative.

3. A carving material composed of substantially five pounds of diatomaceous earth material, art color in the amount required, animal fat three ounces, lye crystals two ounces, dextrin two ounces and about one quarter ounce of preservative.

4. A carving material composed of diatomaceous earth, art color in the amount required, saponifiable fat, lye, and a water softening dextrinous binder mixed with water to a plastic constituency in proper proportions, moulded into a block and allowed to set until fit for use.

5. A carving material consisting of diatomite five pounds, coloring matter about two ounces, animal fat approximately three ounces, lye one ounce, dextrin two ounces and one quarter ounce of aromatic preservative all mixed into a mass and finally mixed with clear water to plastic consistency and allowed to set until it is hardened sufficiently for use.

6. A carving material composition as follows: diatomaceous earth of the order of five pounds, art color of the order of two ounces, animal fat about three ounces, lye about one ounce, a water soluble dextrine binder about two ounces, with sufficient water to render the ingredients plastic enough to form into the required shape, which is then allowed to air harden until in condition for use.

7. A carving material composed of diatomaceous earth material substantially clean, a dextrinous binder, fat, and lye in proper proportions, the whole mixed with water to plastic consistency, formed into suitable blocks and allowed to set until ready for use.

ESTHER BLY WILLIAMS.